United States Patent
Urmanova et al.

(10) Patent No.: US 7,622,531 B2
(45) Date of Patent: Nov. 24, 2009

(54) POWDER PAINT COMPOSITION

(75) Inventors: Antonia Urmanova, Zwolle (NL);
Eimbert Gerrit Belder, Zwolle (NL);
Jurjen Bolks, Zwolle (NL); Coenraad Maarten Gehrels, Zwolle (NL)

(73) Assignee: DSM IP Assets B.V., Heerlen (NL)

( * ) Notice: Subject to any disclaimer, the term of this patent is extended or adjusted under 35 U.S.C. 154(b) by 483 days.

(21) Appl. No.: 10/559,786

(22) PCT Filed: Jun. 10, 2004

(86) PCT No.: PCT/NL2004/000411

§ 371 (c)(1),
(2), (4) Date: May 30, 2006

(87) PCT Pub. No.: WO2004/111142

PCT Pub. Date: Dec. 23, 2004

(65) Prior Publication Data
US 2006/0258806 A1  Nov. 16, 2006

(30) Foreign Application Priority Data
Jun. 18, 2003  (EP)  ............................. 03076908

(51) Int. Cl.
*C08L 31/00* (2006.01)
*C08L 33/00* (2006.01)
*C08L 35/00* (2006.01)

(52) U.S. Cl. ............. 525/326.2; 525/326.3; 525/326.4; 525/327.4; 525/327.6; 525/327.7; 525/330.3; 525/330.4; 525/330.5; 525/330.7; 525/331.9; 525/332.3; 525/332.5; 525/332.7; 525/333.2; 525/333.3; 525/333.6; 525/374; 525/379; 525/383; 525/384; 525/390; 525/398; 525/437; 525/453

(58) Field of Classification Search ............. 525/326.2, 525/326.3, 326.4, 327.4, 327.6, 327.7, 330.3, 525/330.4, 330.5, 330.7, 331.9, 332.3, 332.5, 525/332.7, 333.2, 333.3, 333.6, 374, 379, 525/383, 384, 390, 398, 437, 453
See application file for complete search history.

(56) References Cited

U.S. PATENT DOCUMENTS

| 5,346,960 A | * | 9/1994 | Merritt et al. ................ 525/221 |
| 6,624,259 B1 | * | 9/2003 | Richardson et al. ......... 525/438 |
| 2002/0091203 A1 | | 7/2002 | Van Benthem et al. |

FOREIGN PATENT DOCUMENTS

| EP | 0 322 807 | 7/1989 |
| EP | 0 322 827 | 7/1989 |
| EP | 0 419 003 | 3/1991 |
| EP | 0 582 363 | 2/1994 |
| EP | 1 081 176 | 3/2001 |

OTHER PUBLICATIONS

International Search Report.
Raval et al, "β-*Hydroxyalkyl amide type eco-firendly cross-linking agent for carboxylic acid functional acrylic resin for surface coating*", Paintindia, ISSN 0556-4409, 2005, vol. 55, No. 6, pp. 37-46.
Encyclopedia of Polymer Science, vol. 9, pp. 720-721 (2002).
Blank et al, "*Catalysis of the epoxy-carboxyl reaction*", International Waterborne, High-solids and Powder Coatings Symposium; Feb. 21-23, 2001, New Orleans, LA.

* cited by examiner

Primary Examiner—Ana L Woodward
(74) Attorney, Agent, or Firm—Nixon & Vanderhye P.C.

(57) ABSTRACT

The present invention relates to a powder paint composition comprising at least (a) a thermosetting polymer having functional groups capable of reacting with β-hydroxyalkylamide units (b) a compound comprising β-hydroxyalkylamide units and (c) a deceleration agent, capable of reversibly blocking the functional groups of polymer (a). The deceleration agent is present in an amount sufficient to block at least 9% of the total amount of functional groups of polymer (a). The present invention relates also to the use of a specific amine compound as a deceleration agent in a powder paint composition.

11 Claims, No Drawings

POWDER PAINT COMPOSITION

This application is the US national phase of international application PCT/NL2004/000411 filed 10 Jun. 2004 which designated the U.S. and claims benefit of EP 03076908.7, dated 18 Jun. 2003, the entire content of which is hereby incorporated by reference.

The present invention relates to a powder paint composition comprising a polymer comprising functional groups capable of reacting with β-hydroxyalkylamide units and a β-hydroxyalkylamide compound.

A powder paint composition comprising a β-hydroxyalkylamide compound and a polymer comprising functional groups capable of reacting with β-hydroxyalkylamide units is disclosed in U.S. Pat. No. 4,801,680. A powder paint composition comprising a β-hydroxyalkylamide compound results in a high reactivity of the powder paint composition causing for example a low blister limit, especially when relatively thick coating layers are applied. The blister limit or degassing limit is the coat thickness at which gas bubbles remain in the coating after curing.

It is another disadvantage of this powder paint composition that the flow of the composition once applied to the substrate and heated to spread over the surface is not sufficient for some specific powder coating applications because of the formation of the "orange peel" effect.

WO 01/02505A discloses a method to overcome these disadvantages by adapting the polymers used in the powder paint composition. However, although a higher blister limit may be reached, the modification of the polymer also results in the modification of the chemical and mechanical properties of the resulting coating, such as for example an undesired decrease in flexibility and an undesired decrease of solvent resistance.

Another undesirable effect is due to a decrease of the glass transition temperature (Tg) of the polymer, which may result in a decreased powder stability upon further processing the composition in an extruder or upon storage of the powder paint composition.

It is the object of the present invention to provide a powder paint composition comprising
 (a) a polymer comprising functional groups capable of reacting with β-hydroxyalkylamide units and
 (b) a β-hydroxyalkylamide compound resulting in a coating with a high blister limit and having also the desired mechanical properties.

The powder paint composition according to the present invention comprises at least:
(a) a thermosetting polymer comprising functional groups capable of reacting with β-hydroxyalkylamide units,
(b) a compound comprising β-hydroxyalkylamide units and
(c) a deceleration agent, capable of reversibly blocking the functional groups of polymer (a)

wherein the deceleration agent is present in an amount sufficient to block at least 9% of the total amount of functional groups of the polymer (a).

The deceleration agent (c) is a compound that is capable of slowing down the curing reaction. In the composition according to the invention it is essential that the deceleration agent is capable of reversibly blocking the functional groups of polymer (a).

The deceleration agent reversibly blocks the functional groups of polymer (a) and consequently the powder paint composition according to the present invention results in a coating having an improved blister limit and in a coating showing desired mechanical properties.

Further advantages are for example a longer gel time, an improved flow, an improved boiling water/humidity resistance, an improved pigment dispersion and good mechanical properties, for example flexibility. The resulting coating also has antibacterial and/or antifouling properties.

Preferably, the thermosetting polymer (a) comprising functional groups capable of reacting with β-hydroxyalkylamide units is a polymer containing functional carboxylic acid groups or a polymer containing functional anhydride groups.

Suitable polymers include for example a polyester, a polyacrylate, a polyether (for example a polyether based on bisphenol or a phenol-aldehyde novolak), a polyurethane, a polycarbonate, a trifluoroethylene copolymer or a pentafluoropropylene copolymer, a polybutadiene, a polystyrene and/or a styrene maleic anhydride copolymer.

Preferably the polymer (a) is a polyester.

More preferably the polyester is a carboxylic acid group-containing polyester.

Suitable polyesters may be based for example on a condensation reaction between a linear aliphatic, branched aliphatic and/or cyclo-aliphatic polyol and an aliphatic, cycloaliphatic and/or aromatic poly carboxylic acid or its anhydride. The ratio of polyol and acids or anhydrides is selected such that there is an excess of acid or anhydride over alcohol (so as) to form a polyester which has free carboxylic groups or anhydride groups.

The polyester may comprise units of for example isophthalic acid, terephthalic acid, 2,6-naphthalene dicarboxylic acid, 4,4'-oxybisbenzoic acid, 3,6-dichloro phthalic acid, tetrachloro phthalic acid, tetrahydro phthalic acid, trimellitic acid, pyromellitic acid, hexahydro terephthalic acid (cyclohexane dicarboxylic acid), hexachloro endomethylene tetrahydro phthalic acid, phthalic acid, azelaic acid, sebacic acid, decane dicarboxylic acid, adipic acid, succinic acid, maleic acid and/or fumaric acid. These acids may be used as such, or, in so far as available as their anhydrides, acid chlorides or lower alkyl esters.

Preferably, the polyester comprises at least isophthalic acid units and/or terephthalic acid units.

The polyester may also comprise other carboxylic acid units in amounts of up to for example 25 mol % of the total amount of carboxylic acids. Also trifunctional or higher functional acid units may be present, such as for example trimellitic acid or pyromellitic acid. These tri or higher functional acids may be used to obtain branched polyesters or used as end groups of the polyester.

Hydroxy carboxylic acids and/or optionally lactones may also be used, for example, 12-hydroxy stearic acid, hydroxy pivalic acid and/or ε-caprolactone.

Also monocarboxylic acids such as for example benzoic acid, tert.-butyl benzoic acid, hexahydro benzoic acid and/or saturated aliphatic monocarboxylic acids may be applied.

Useful polyalcohols, in particular diols, reactable with the carboxylic acids to obtain the polyester include aliphatic diols. Suitable examples include ethylene glycol, propane-1, 2-diol, propane-1,3-diol, butane-1,2-diol, butane-1,4-diol, butane-1,3-diol, 2,2-dimethylpropanediol-1,3 (=neopentyl glycol), hexane-2,5-diol, hexane-1,6-diol, 2,2-bis-(4hydroxy-cyclohexyl)-propane (hydrogenated bisphenol-A), 1,4-dimethylolcyclohexane, diethylene glycol, dipropylene glycol, 2,2-bis[4-(2-hydroxy ethoxy)-phenyl]propane, the hydroxy pIValic ester of neopentyl glycol, 2-ethyl, 2-butyl propanediol-1,3 (=butylethylpropane diol), 2-ethyl, 2-methyl propanediol-1,3 (=ethylmethylpropane diol) and/or 2-methylpropanediol-1,3 (MP-Diol).

Tri- or higher functional alcohols may be used in small amounts in order to obtain branched polyesters. Examples of suitable polyols include glycerol, hexanetriol, trimethylol ethane, trimethylol propane tris-(2-hydroxyethyl)-isocyanurate, pentaerythritol and/or sorbitol.

The polyester may be prepared according to conventional procedures by esterification or transesterification, optionally in the presence of customary esterification catalysts for example dibutyltin oxide or tetrabutyl titanate. The preparation conditions and the COOH/OH ratio may be selected so as to obtain end products that have an acid number and/or a hydroxyl number within the targeted range of values.

Generally, the polymer (a) has an acid value between 15 and 120 mg KOH/gram resin and more preferably the polymer (a) has an acid value between 15 and 80 mg KOH/gram resin.

The number average molecular weight (Mn) of the polymer (a) may be for example between about 1,000 and about 8,000. Preferably the number average molecular weight (Mn) of the polymer (a) ranges between about 1,400 and 7,500.

The polymer (a) may be a crystalline, semi-crystalline or amorphous solid at room temperature. In case the polymer is crystalline, it has a melting temperature Tm, in case it is semi-crystalline it has a melting temperature Tm and a glass transition temperature Tg, in case it is amorphous, it has a glass transition temperature Tg. These temperatures are determined by use of a differential scanning calorimeter (DSC) using standard DSC-techniques, for example a DSC 821-E from Mettler Toledo. The DSC-measurement is performed with a heating and cooling rate of 5° C./min.

Preferably, the polymer (a) is an amorphous solid at room temperature. The glass transition temperature of the polymer may range between 20° C. and 100° C., preferably between 35° C. and 85° C. and more preferably between 40° C. and 75° C.

The polymer (a) may have a viscosity lower than 200 Pa·s (measured at 160° C., Rheometrics CP 5) and preferably the polymer (a) has a viscosity lower than 150 Pa·s.

The compound comprising β-hydroxyalkylamide units (b) may be a curing agent for polymer (a).

Generally, the hydroxyl functionality of the β-hydroxyalkylamide compound is on an average basis at least 2 and preferably greater than 2.

Preferably, the hydroxyl functionality of the β-hydroxyalkylamide is lower than 10. More preferably the hydroxyl functionality of the β-hydroxyalkylamide compound is lower than 6 and most preferably the hydroxyl functionality of the β-hydroxyalkylamide compound is equal to or lower than 4.

According to a preferred embodiment of the invention the hydroxyl functionality of the β-hydroxyalkylamide ranges from greater than 2 up to and including 4.

Examples of suitable β-hydroxyalkylamide compounds (b) are disclosed in U.S. Pat. No. 4,801,680, which content is hereby incorporated by reference.

Preferably the β-hydroxyalkylamide compound is a compound according to formula (I):

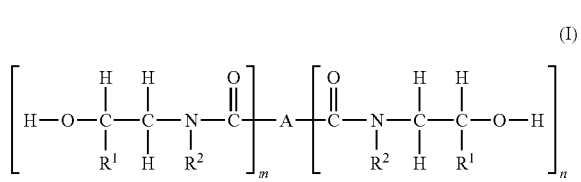

(I)

wherein
$R_1$ is H or $C_1$-$C_5$ alkyl;
$R_2$ is H, $C_1$-$C_5$ alkyl or

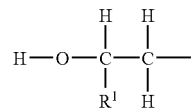

wherein $R_1$ is as described above;

A is a bond, monovalent or polyvalent organic radical derived from a saturated, unsaturated or aromatic hydrocarbon including substituted hydrocarbon radicals containing from 2 to 20 carbon atoms;

m is equal to 1 to 2;

n is equal to 0 or 2;

and m+n is at least 2.

Preferably, A is an alkylene radical —$(CH_2)_x$— where x ranges from 2 to 12. Preferably, x ranges from 4 to 10.

Preferably m+n is greater than 2, more preferably within the range of from 2 up to and including 4.

The β-hydroxyalkylamide compound can be prepared by reacting a lower alkyl ester or a mixture of esters of carboxylic acids with a β-hydroxyalkylamine at a temperature ranging from ambient temperature up to about 200° C., depending on the choice of reactants and on the presence or absence of a catalyst. Suitable catalysts, include base catalysts such as sodium methoxide, potassium methoxide, sodium butoxide, potassium butoxide, sodium hydroxide, potassium hydroxide and the like, present in amounts of about 0.1 to about 1 percent by weight based on the weight of the alkyl ester.

Suitable examples of β-hydroxylamides are described in for example U.S. Pat. No. 4,727,111, U.S. Pat. No. 4,788,255, U.S. Pat. No. 4,076,917, EP-A-322834 and EP-A-473380.

Suitable examples of commercially available β-hydroxyalkylamide compounds are for example N,N,N',N'-tetrakis-(2-hydroxyethyl)-adipamide (Primid XL-552) and N,N,N',N'-tetrakis-(2-hydroxypropyl)-adipamide (Primid QM 1260).

Also larger β-hydroxyalkylamide compounds are suitable to be applied in the composition according to the present invention. Examples of such β-hydroxyalkylamide compounds are the polyesteramides as described in WO99/16810, which content is incorporated herein by reference.

WO99/16810 describes linear or branched condensation polymers containing ester groups and at least one amide group in the backbone, having at least one hydroxyalkylamide end group and having a weight average molecular mass of >800 g/mol.

Another example of a suitable β-hydroxyalkylamide compound (b) is a, branched polyesteramide comprising at least two groups according to formula (II):

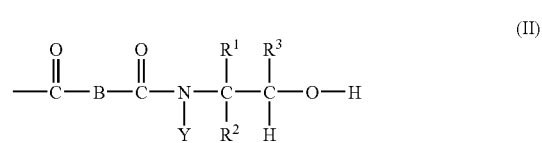

(II)

in which

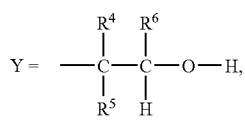

H, $(C_1-C_{24})$(cyclo)alkyl or $(C_6-C_{10})$ aryl, B=$(C_2-C_{24})$, optionally substituted, aryl or (cyclo)alkyl aliphatic diradical, and $R^1$, $R^2$, $R^3$, $R^4$, $R^5$ and $R^6$ may, independently of one another, be the same or different, H, $(C_6-C_{10})$ aryl or $(C_1-C_8)$(cyclo) alkyl radical.

More preferably, the commercially available β-hydroxyalkylamides N,N,N',N'-tetrakis-(2-hydroxyethyl)-adipamide and N,N,N',N'-tetrakis-(2-hydroxypropyl)-adipamide are used.

Preferably, the equivalent ratio of β-hydroxyalkylamide (hydroxy equivalents) to carboxy-containing polyester (carboxylic acid equivalents) ranges preferably between about 0.6:1 and 1.6:1, more preferably between 0.8:1 and 1.3:1 and most preferably between 0.9:1 and 1.15:1. This ratio results in the desired effective cure of the powder paint composition. A ratio outside the range between 0.6:1 and 1.6:1 will give a poor cure of the composition.

The present invention is characterised in that the powder paint composition comprises a deceleration agent (c) and the deceleration agent (c) should be present in an amount sufficient to block at least 9% of the total amount of functional groups of polymer (a) capable of reacting with β-hydroxyalkylamides. At most 100% of the total amount of functional groups of polymer (a) capable of reacting with β-hydroxyalkylamides may be blocked.

Preferably the deceleration agent is present in an amount sufficient to block 10%-50% of the total amount of functional groups of the polymer (a) and more preferably between 15 to 30% of functional groups. The amount of deceleration agent (c) depends on the desired amount of reversibly blocked functional groups in polymer (a) and on the amount of functional groups in polymer (a).

The reversible blocking of a functional group may be established in many ways, for example by forming a bond that is only stable within a certain temperature range. The reversible block may be for example in form of a hydrogen bridge, an ionic bond or a salt complex.

Preferably a salt complex is formed

Preferably the blocking is reversed within the temperature range of the cure of the powder paint to obtain a coating having the desired properties.

The deceleration agent (c) may be an amine such as for example an aliphatic amine. Preferred aliphatic amines are tertiary amines such as for example an aliphatic tertiary amine.

According to a preferred embodiment of the invention the deceleration agent (c) is a compound according to formula (III) and/or (IV):

or

wherein:
Y is N or P,
$R^1$, $R^2$, $R^3$ or $R^4$ are independently of each other, substituted or unsubstituted carbon chains with 1-50 carbon atoms in the main chain and
$X^-$ is halide.

According to a preferred embodiment of the invention the deceleration agent (c) is a compound according to formula (III).

According to a further preferred embodiment of the invention Y is nitrogen.

According to another preferred embodiment of the invention $R^1$, $R^2$, $R^3$ and $R^4$ are unsubstituted carbon chains because substituted chains may cause sterical hindrance, resulting in the incapability of the compound to reversibly block the functional groups of polymer (a).

Preferably at least two of $R^1$, $R^2$, $R^3$ and $R^4$ have 1-8 carbon atoms.

More preferably at least two of $R^1$, $R^2$, $R^3$ and $R^4$ have 1-4 carbon atoms.

Examples of suitable compounds according to formula (III), with Y being nitrogen are octyldimethylamine, decyldimethylamine, dodecyldimethylamine, tetradecyldimethylamine, hexadecyldimethylamine, octadecyldimethylamine, didodecylmonomethylamine, ditetradecylmonomethylamine, dihexadecylmonomethylamine, di-tallow alkylmonomethylamine, (hydrogenated tallow alkyl)-dimethylamine, trioctylamine, tridecylamine, and/or tridodecylamine.

Preferred compounds according formula (III) are octyldimethylamine, decyldimethylamine, dodecyldimethylamine, tetradecyldimethylamine, hexadecyldimethylamine, octadecyldimethylamine, (hydrogenated tallow alkyl)-dimethylamine and/or hexadecyldimethylamine (palmityldimethylamine).

Suitable examples of formula (III) with Y being phosphorus are dodecyldiphenylphosphine, decyldiphenylphosphine, octyldiphenylphosphine and/or trioctylphospine.

Suitable examples of compounds according to formula (IV) with Y being nitrogen are octyltrimethyl ammonium halides, decyltrimethyl ammonium halides, dodecyltrimethyl ammonium halides, tetradecyltrimethyl ammonium halides, hexadecyltrimethyl ammonium halides, octadecyltrimethyl ammonium halides, didodecyldimethyl ammonium halides, ditetradecylmonomethyl ammonium halides, dihexadecylmonomethyl ammonium halides, di tallow alkylmonomethyl ammonium halides, trioctyl ammonium halides, tridecyl ammonium halides and/or tridodecyl ammonium halides.

Suitable examples of compounds according to formula (IV) with Y being phosphorus are octyltrimethyl phosphonium halides, decyltrimethyl phosphonium halides, dodecyltrimethyl phosphonium halides, tetradecyltrimethyl phosphonium halides, hexadecyltrimethyl phosphonium halides, octadecyltrimethyl phosphonium halides, didodecyldimethyl phosphonium halides, ditetradecylmonomethyl phosphonium halides, dihexadecylmonomethyl phosphonium halides, ditallowalkylmonomethyl phosphonium halides, trioctyl phosphonium halides, tridecyl phosphonium halides and/or tridodecyl phosphonium halides.

The present invention also relates to a novel use for the compounds according to formula (III) and/or formula (IV) in polyester powder paints because surprisingly it has been found that these compounds are suitable to be added as a deceleration agent in a powder paint composition comprising a β-hydroxyalkylamide compound.

The amine compounds according to formula (III) and/or formula (IV) are known to be applied as a cure catalyst in an epoxy comprising powder paint system, such as for example disclosed in WO01/68781. It is quite surprising that these compounds have a decelerating effect in the powder paint composition according to the invention resulting in for example a lower blister limit. Other advantages may for example be better pigment dispersion, improved processability of the powder paint composition, better flow during heating of the powder paint composition after application of the powder on the substrate.

The powder paint composition according to the invention can optionally contain pigments, fillers and/or the usual additives, for example degassing agents, flow agents and (light) stabilizers.

The pigments may be inorganic or organic. Suitable inorganic pigments are for example, titanium dioxide, zinc sulphide, iron oxide and/or chromium oxide. Suitable organic pigments are for example azo compounds.

Suitable fillers are for example metal oxides, silicates, carbonates and sulphates.

Suitable stabilizers are for example primary and/or secondary antioxidants and UV stabilizers for example quinones, (sterically hindered) phenolic compounds, phosphonites, phosphites, thioethers and HALS (hindered amine light stabilizers).

Examples of suitable degassing agents include cyclohexane dimethanol bisbenzoate, benzoin and benzoin derivatives such as for example described in WO02/50194.

Other suitable additives are for example additives for improving tribo-chargeability such as for example sterically hindered amines. These amines are not suitable to be applied as a deceleration agent in the composition according to the present invention because due to the sterical hindrance they are not capable to reversibly block the functional groups of polymer (a) and they are not able to form a salt complex.

According to a preferred embodiment of the invention the powder paint composition is prepared by a process comprising at least the steps of:
a) producing a polymer (a) having functional groups capable of reacting with β-hydroxyalkylamide units at the processing temperature Tp;
b) adding a deceleration agent (c) to the polymer (a) at temperature Ta, wherein Ta is equal to or lower than Tp but higher than the Tg or Tm of the polymer, in an amount sufficient to block at least 9% of the functional groups of polymer (a) capable of reacting with β-hydroxyalkylamide units.

Preferably, the deceleration agent (c) is added before the polymer (a) is cooled down to below its Tg or Tm, for example at the end of production of the polymer.

It is also possible to add the deceleration agent (c) to the polymer (a) and optionally the compound comprising β-hydroxyalkylamide units (b) during production of the powder paint composition The preparation of a powder paint composition in general is described by Misev in Powder paints, Chemistry and Technology (1991, John Wiley) on pp. 224-227. Generally, the components of the composition are premixed, for example by dry blending or drum mixed. The resulting premix is then homogenised at temperatures between about 70° C.-150° C. in an extruder. The extrudate is then cooled down and grinded to a powder with a 10 μm-150 μm particle size, resulting in a powder paint composition.

The powder paint composition can be deposited on the substrate by use of a powder gun such as an electrostatic corona gun or a tribo gun. Also well-known methods of powder deposition such as for example the fluidised bed technique can be used.

The powder paint composition according to the invention can be cured to a powder coating by the generally known curing techniques, for example thermal curing or curing with infrared radiation. Thermal curing can for example take place in a gas oven or in an electrical oven. The temperature during curing can be tailored to one's needs, depending on the coating composition to be cured and/or on the substrate. A suitable temperature range may be between 140° C. and 200° C. The time necessary to obtain a coating with acceptable coating properties can be chosen between wide ranges, for example between 4 minutes to 30 minutes and preferably between 6 minutes and 10 minutes.

The invention also relates to an entirely or a partly coated substrate wherein the coating is obtained from curing the paint composition according to the invention.

The present invention is illustrated with reference to the following, non-limiting examples.

EXAMPLES

Experiment I-III

Preparation of the polymer I-III.

For the preparation of the polymers I-III URALAC P 865 (a carboxylic functional polyester, available from DSM Coating Resins, with acid value range AV=33-37 mgKOH/g and Tg=56° C.) had been used as the base resin.

URALAC P865 was synthesised by direct esterification at a temperature range of between 220° C. and 270° C.

After synthesis, the obtained polyester was split in three parts having the same characteristics which were processed further into polymers I, II and III respectively.

Experiment I

Polymer I was obtained by cooling down to 25° C. the first part of the lab batch.

Experiment II

Polymer II was obtained by adding 2% by weight of hexadecyldimethylamine (HDMA) to the second part at 195° C. The mixture was stirred for 30 min at 195° C. Then the resin was cooled down to 20° C.

Experiment III

Polymer III was obtained by adding 3.25% by weight of hexadecyldimethylamine (HDMA) to the third part at 195° C. The mix was stirred for 30 min at 195° C. Then the resin was cooled down to 20° C.

Examples I, II, III and Comparative Experiment A

Preparation of the Powder Paint Compositions

Four powder paint compositions containing the ingredients as described in Table 1 (in parts by weight) were prepared.

TABLE 1

|  | Powder Paint Composition A | Powder Paint Composition I | Powder Paint Composition II | Powder Paint Composition III |
|---|---|---|---|---|
| Polymer I | 190 | 190 | * | * |
| Polymer II | * | * | 190 | * |
| Polymer III | * | * | * | 190 |
| HDMA | * | 3.87 | * | * |

TABLE 1-continued

|  | Powder Paint Composition A | Powder Paint Composition I | Powder Paint Composition II | Powder Paint Composition III |
|---|---|---|---|---|
| Primid XL-552[1] | 10 | 10 | 10 | 10 |
| Kronos 2160[2] | 100 | 100 | 100 | 100 |
| Benzoin | 3 | 3 | 3 | 3 |
| Resiflow PV 5[3] | 8.333 | 8.333 | 8.333 | 8.333 |

[1]Primid (EMS)
[2]Kronos 2160 (Kronos Titan GmbH)
[3]Resiflow PV5 (Worlée-Chemie GmbH)

The ingredients were mixed in a premixer, homogenised and extruded in a double screw extruder Prism. The extrudate was milled and sieved to a powder with particle size less than 90μ.

The powders were sprayed electrostatically oh an aluminium substrate (AL-46). The coated substrates were cured for 10 minutes at 180° C. Table 2 shows the properties of the resulting coated substrates

TABLE 2

|  | Comparative Experiment A | Example I | Example II | Example III |
|---|---|---|---|---|
| Gel time at 180° C., sec[1] | 220 | 248 | 259 | 308 |
| Flow[2] | 6 | 6+ | 7 | 8 |
| Degassing limit (μm)[3] | 120 | 129 | 140 | 154 |
| Impact[4] |  |  |  |  |
| 60ip/75μ initial | Pass | Pass | Pass | Pass |
| 60ip/75μ after 1 day | Pass | Pass | Pass | Pass |
| Heat Stability (b*)[5] |  |  |  |  |
| b* initial | 0.6 | 0.5 | 0.7 | 1.0 |
| b* 60' 220° C. | 5.7 | 5.6 | 3.6 | 4.1 |
| db* 60' 220° C. | 5.1 | 5.1 | 2.9 | 3.0 |
| b* 10' 240° C. | 2.4 | 2.5 | 2.4 | 2.6 |
| db* 10' 240° C. | 1.7 | 2.0 | 1.7 | 1.6 |
| QUV-B resistance[6], hrs | 450 | 462 | 504 | 509 |

[1]DIN 55990
[2]Flow is determined visually on is 1-10 with 10 = best according to the internal DSM method PCAII-002
[3]The blister limit is determined according to the internal DSM method PCAII-018
[4]ASTM D2794
[5]The colour properties of the powder paint are expressed in a b*-value, measured with a Dr Lange Micro Colour Meter measured at a layer thickness of 60 μm according to ISO 7724.
[6]4 hrs UV-B 50° C./4 hrs cond. 40° C. is determined according to the internal DSM method PCAII-004

The presence of the deceleration agent leads to an improvement of the degassing properties, the heat stability and the QUV resistance.

The invention claimed is:

1. A powder paint composition comprising at least:
(a) a thermosetting polymer having functional groups capable of reacting with β-hydroxyalkylamide units
(b) a compound comprising β-hydroxyalkylamide units and
(c) a deceleration agent which reversibly blocks the functional groups of polymer (a) by forming a reversible bond with the functional groups of polymer (a) in the form of a hydrogen bridge, an ionic bond or a salt complex such that the curing reaction is slowed, wherein the deceleration agent is present in an amount sufficient to block at least 9% of the total amount of functional groups of polymer (a).

2. A powder paint composition according to claim 1, wherein the polymer (a) is a carboxylic acid functional polymer or an anhydride functional polymer.

3. A powder paint composition according to claim 1, wherein the deceleration agent (c) is a compound according to formula (III) and/or (IV):

$$YR^1R^2R^3 \quad (III)$$

or $$(YR^1R^2R^3R^4)^+X^- \quad (IV)$$

wherein:
Y is N or P,
$R^1$, $R^2$, $R^3$ or $R^4$ are independently of each other carbon chains with 1-50 carbon atoms in the main chain and
$X^-$ is halide.

4. A powder paint composition according to claim 3, wherein the deceleration agent (c) is a compound according to formula (III).

5. A powder paint composition according to claim 3, wherein Y is N.

6. A powder paint composition according to claim 3, wherein $R^1$, $R^2$, $R^3$ and $R^4$ are unsubstituted carbon chains.

7. A powder paint composition according to claim 1, wherein the deceleration agent is octyldimethylamine, decyldimethylamine, dodecyldimethylamine, tetradecyldimethylamine, hexadecyldimethylamine, octadecyldimethylamine, (hydrogenated tallow alkyl)-dimethylamine and/or hexadecyldimethylamine.

8. A process for the preparation of a precursor powder paint composition according to claim 1 comprising at least the steps of:
a) producing the polymer (a) having functional groups capable of reacting with β-hydroxyalkylamide units at the processing temperature Tp;
b) adding the deceleration agent (c) to the polymer (a) at temperature Ta, wherein Ta is equal to or lower than Tp but higher than the Tg or Tm of the polymer, in an amount sufficient to block at least 9% of the functional groups of the polymer (a) capable of reacting with β-hydroxyalkylamide units.

9. A process according to claim 8, wherein the deceleration agent is added before the polymer is cooled down to below its Tg or Tm.

10. A process for curing a powder paint composition on a substrate comprising applying the powder paint composition according to claim 1 onto a substrate and then curing the powder paint composition.

11. A method of decelerating the reaction between functional groups of a thermosetting polymer and β-hydroxyalkylamide units of a β-hydroxyalkylamide compound, the method comprising adding to the thermosetting polymer an effective amount of a reaction deceleration agent comprised of a tertiary compound according to formula (III) and/or (IV):

$$YR^1R^2R^3 \quad (III)$$

or $$(YR^1R^2R^3R^4)^+X^- \quad (IV)$$

wherein:
Y is N or P
$R^1$, $R^2$, $R^3$ or $R^4$ are independently of each other, substituted or unsubstituted carbon chains with 1-50 carbon atoms in the main chain and
$X^-$ is halide.

* * * * *